DESIGN.
L. BROWN.
CAMERA CASE.
APPLICATION FILED OCT. 4, 1920.
Reissued Dec. 14, 1920. 15,003.
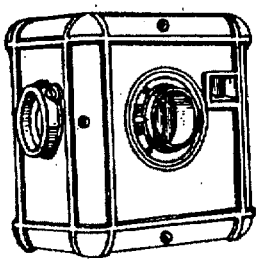
Inventor:
Lloyd Brown,
by
James T. Berdell
his Attorney.

UNITED STATES PATENT OFFICE.

LLOYD BROWN, OF LOS ANGELES, CALIFORNIA, ASSIGNOR TO SILENT DRAMA SYNDICATE, A TRUSTEESHIP, LLOYD BROWN AND ALEXANDER GRAYDON, TRUSTEES.

DESIGN FOR A CAMERA-CASE.

15,003. Specification for Reissued Design. Reissued Dec. 14, 1920.

Original No. 55,978, dated August 10, 1920, Serial No. 348,190, filed December 19, 1919, for 14 years. Application for reissue filed October 4, 1920. Serial No. 414,676. Term of patent 14 years.

*To all whom it may concern:*

Be it known that I, LLOYD BROWN, a citizen of the United States, residing at Los Angeles, in the county of Los Angeles, State of California, have invented a new, original, and ornamental Design for a Camera-Case, of which the following is a specification, reference being had to the accompanying drawing, forming part thereof.

The figure is a perspective view of a camera case, showing my new design.

I claim:

The ornamental design for a camera case, as shown.

LLOYD BROWN.

Witnesses:

VIRGINIA I. BERINGER,

JAMES T. BARKELEW.